US009067367B2

(12) United States Patent
Heino et al.

(10) Patent No.: US 9,067,367 B2
(45) Date of Patent: Jun. 30, 2015

(54) METHOD AND SYSTEM FOR PERFORMING AN INFRARED TREATMENT

(75) Inventors: Aarne Heino, Tampere (FI); Iiya Kaufman, Calgary (CA)

(73) Assignee: Pexcor Manufacturing Company, Inc., Calgary (CA)

( * ) Notice: Subject to any disclaimer, the term of this patent is extended or adjusted under 35 U.S.C. 154(b) by 460 days.

(21) Appl. No.: 13/410,503

(22) Filed: Mar. 2, 2012

(65) Prior Publication Data

US 2013/0228955 A1    Sep. 5, 2013

(51) Int. Cl.

| | |
|---|---|
| *B29C 67/00* | (2006.01) |
| *B29C 35/10* | (2006.01) |
| *B29C 47/88* | (2006.01) |
| *B29C 47/92* | (2006.01) |
| *B29C 71/04* | (2006.01) |
| *B29C 47/00* | (2006.01) |
| *B29C 35/08* | (2006.01) |
| *B29C 35/16* | (2006.01) |
| *B29K 105/04* | (2006.01) |
| *B29K 105/24* | (2006.01) |
| *B29K 301/10* | (2006.01) |
| *B29L 31/00* | (2006.01) |

(52) U.S. Cl.
CPC ............... *B29C 71/04* (2013.01); *B29C 35/10* (2013.01); *B29C 47/0023* (2013.01); *B29C 47/0071* (2013.01); *B29C 47/881* (2013.01); *B29C 47/882* (2013.01); *B29C 47/92* (2013.01); *B29C 2035/0822* (2013.01); *B29C 2035/1658* (2013.01); *B29C 2947/92714* (2013.01); *B29K 2023/06* (2013.01); *B29K 2105/04* (2013.01); *B29K 2105/24* (2013.01); *B29K 2301/10* (2013.01); *B29L 2031/00* (2013.01)

(58) Field of Classification Search
USPC ......... 264/492, 493, 494, 495, 496, 488, 464, 264/476, 477, 479, 480, 481
See application file for complete search history.

(56) References Cited

U.S. PATENT DOCUMENTS

| | | | | |
|---|---|---|---|---|
| 6,106,761 A | * | 8/2000 | Sjoberg et al. | 264/492 |
| 2002/0034909 A1 | * | 3/2002 | Bansal et al. | 442/361 |

FOREIGN PATENT DOCUMENTS

| | | | |
|---|---|---|---|
| EP | 2052830 | * | 4/2009 |
| FI | 981239 | | 3/1999 |
| GB | 2283489 A | | 5/1995 |
| WO | WO 2013/130138 A1 | | 9/2013 |

OTHER PUBLICATIONS

International Search Report & Written Opinion in PCT/US12/066703 dated Mar. 4, 2013.

* cited by examiner

*Primary Examiner* — Stella Yi
(74) *Attorney, Agent, or Firm* — Barnes & Thornburg LLP; Michael A. Carrillo; Erin J. Fox

(57) ABSTRACT

A method for performing an infrared treatment includes the steps of receiving an extruded product and feeding the extruded product to an oven including at least one lamp unit. The lamp unit includes a lamp, a reflective surface enclosing a first side of the lamp and positioned to direct radiation from the lamp, and a glass disposed between a second side of the lamp and an extruded product, wherein the glass separates the lamp and the extruded product. The method further includes the step of creating cross-linking between layers of the extruded product by directing the radiation at the extruded product. Still further, the method includes the steps of directing a first gas flow at a surface of the product and directing a second gas flow at the glass at an intensity, direction, and temperature that prevents the glass from becoming an infrared source.

13 Claims, 2 Drawing Sheets

METHOD AND SYSTEM FOR PERFORMING AN INFRARED TREATMENT

BACKGROUND OF THE INVENTION

The present invention relates generally to methods and apparatuses for performing an infrared treatment, and more particularly, to methods and apparatuses for performing an infrared treatment on extruded plastic and elastomeric products in an infrared oven.

It is known in the prior art to heat plastic or elastomeric product that comes out of the extruder to cross-link the plastic or elastomeric product to obtain a desired effect that changes the capabilities or properties of the product (e.g., increases the strength of the product, changes the product to a solid, etc.). Furthermore, it is known to perform this heating of plastic or elastomeric product using infrared radiation and to use a wavelength of the radiation that penetrates inside the wall of the product in such a way that the heating takes place at the same time in all the depths of the product.

One prior art method is disclosed in patent publication GB 2283 489. In this patent publication, the material is cross-linked by using infrared radiation in such a way that the temperature obtained by the radiation corresponds to the wavelength demanded by the cross-linkage reaction.

A similar prior art method is presented in the patent publication FI 109706. According to this method, an additional material or additive that is used for modifying either physically or chemically the properties of the plastic material is decomposed utilizing infrared radiation, wherein the wavelength is selected so that the radiation penetrates through the plastic material itself as efficiently as possible, but is also absorbed by the additional material, thereby heating and decomposing the additional material.

The greatest disadvantage of the prior art methods is that the infrared radiation inevitably consists of a distribution of different wavelengths. It is also inevitable that a part of this wavelength distribution follows approximately part of the curve of Gauss, and the wavelength distribution has rays of long wavelengths that do not penetrate into the material. Rather, the long wavelengths get absorbed by the surface of the product, causing inconvenient overheating of the product. Overheating causes the surface of the product to become oxidized or to react in some other unwanted way.

Attempts have been made to solve this problem. For example, U.S. Pat. No. 6,106,761 ("the '761 patent") addresses these issues by eliminating the infrared rays that correspond to absorption peaks of the material to be heated in order to minimize overheating of a surface of the material. The '761 patent notes that eliminating these rays may be accomplished by filtering out the unwanted rays. The filtering process disclosed in the '761 patent is very difficult to undertake because, when filtering out certain wavelengths, the filter itself gets overheated and becomes a source of infrared energy that sends the same filtered wavelength to the material, thus overheating the material.

One solution that attempts to avoid the overheating caused by filtering is cooling of the surface of the material during the infrared treatment. This can be done, for example, by blowing cool gas, like air, on the material. The greatest disadvantage of this method is that the air also cools the infrared lamps and reduces the capacity of the lamps. Another disadvantage is that dirt and other debris splashes from the material to the lamps and, thus, the lamps get dirty, which again reduces the capacity of the lamps.

It is very important for the irradiated material to be heated uniformly across an entire cross-section of the material. A method and apparatus for performing an infrared treatment, for example, on plastic and elastomeric products, that overcomes all of the previous obstacles and that uniformly heats the product is therefore desired.

SUMMARY OF THE INVENTION

According to one aspect of the present invention, a method for performing an infrared treatment includes the steps of receiving an extruded plastic or elastomeric product and feeding the extruded plastic or elastomeric product to an oven including at least one lamp unit. The lamp unit includes a lamp, a reflective surface enclosing a first side of the lamp and positioned to direct radiation from the lamp, and a glass disposed between a second side of the lamp and an extruded product, wherein the glass separates the lamp and the extruded product. The method further includes the step of creating cross-linking between the layers of the extruded product by directing the radiation at the extruded product. Still further, the method includes the steps of directing a first gas flow at a surface of the extruded product to cool the surface of the extruded product and directing a second gas flow at the glass at an intensity, direction, and temperature that prevents the glass from becoming an infrared source.

According to another aspect of the present invention, the oven includes a plurality of lamp units each including a plurality of lamps, a reflective surface enclosing a first side of each lamp and positioned to direct radiation from the lamp into parallel rays of radiation, and a glass disposed between a second side of each lamp and an extruded product, wherein the glass separates the lamp and the extruded product. Two lamps are positioned along a first axis and two lamps are positioned along a second axis that is perpendicular to the first axis.

According to a further aspect of the present invention, the lamp is disposed within a housing with the lamp being spaced from a first side of the housing and the glass being disposed adjacent a second side of the housing. In another aspect, a third gas flow is provided through a channel in the housing for cooling components within the housing.

According to yet another aspect of the present invention, a system for performing an infrared treatment on an extruded product includes at least one lamp unit including a lamp and a reflective surface enclosing a first side of the lamp, wherein the reflective surface is positioned to direct radiation from the lamp. The lamp further includes a first gas flow directed at a surface of the extruded product for cooling the extruded product and a glass disposed between a second side of the lamp and the extruded product, wherein the glass separates the lamp and the extruded product and prevents the first gas flow from hitting the lamp. A second gas flow is directed at a side of the glass facing the extruded product for cooling the glass and preventing the glass from becoming an infrared source.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
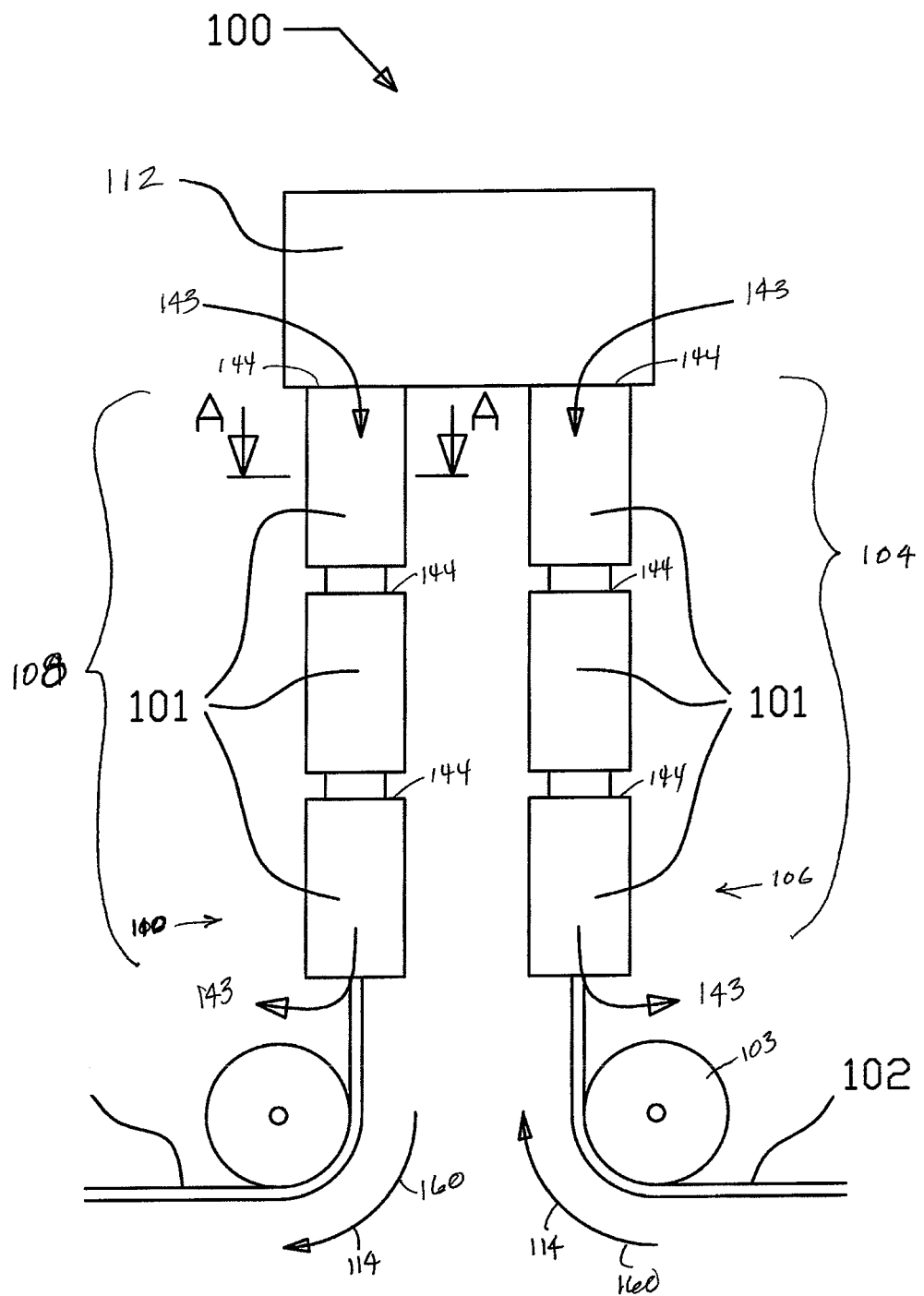
FIG. 1 is a side elevational view of a first embodiment of an apparatus for performing an infrared treatment on a plastic or elastomeric product or material.

Turning now to the figures, wherein like reference numerals refer to like elements, there is illustrated an apparatus or oven 100 for performing an infrared treatment on a plastic or elastomeric product or material. The apparatus performs the infrared treatment without filtering of one or more wavelengths of the radiation.

Referring to FIG. 1, the apparatus in the form of an infrared oven or system 100 is equipped with six infrared lamp units 101. The infrared oven 100 is connected to an extruder (not shown) and extruded product 102 is fed to the infrared oven 100 by the extruder. The extruded product 102 may be fed from the extruder and redirected around a wheel 103 or other transfer mechanism at an angle of about 90 degrees. The extruded product 102 may be any type of extruded material in any shape. In one embodiment, the extruded material may be a plastic or elastomeric tube. In other embodiments, the extruded product 102 is formed of polyethylene and/or includes one or more additional materials, such as additives or cross-linking agents, as known in the art. One non-limiting example of an additional material is a cross-linking peroxide, for example an organic peroxide, which has to be heated to decompose and to create cross-linking. Another non-limiting example of an additional material is a chemical or physical foaming agent that releases gas upon heating to form foaming within the material.

A first set 104 of infrared units 101 includes three infrared units 101 disposed adjacent one another on a first side 106 of the infrared oven 100 and a second set 108 of infrared units 101 includes three infrared units 101 disposed adjacent one another on a second side 110 of the infrared oven 100. A feeding apparatus 112 is disposed between the first and second sets 104, 108 of infrared units 101. The feeding apparatus 112 includes any number of pulleys, gears, wheels, or other mechanisms that aid in moving the extruded product 102 through the infrared oven 100. The feeding apparatus 112 may additionally redirect the extruded product 102, for example, at an angle of about 180 degrees. As can be seen in FIG. 1, the extruded product has a direction of travel 114. The feeding apparatus 112 is disposed between the sets 104, 108 of infrared units 101 such that the first set 104 of infrared units 101 is disposed before the feeding apparatus 112 along the direction of travel 114 and the second set 108 of infrared units 101 is disposed after the feeding apparatus 112 along the direction of travel 114. The positioning of the feeding apparatus 112 allows the feeding apparatus 112 to provide the appropriate guidance to the extruded product through both sets 104, 108 of infrared units 101. Once the extruded product 102 exits the second set 108 of infrared units 101, the extruded product may again be redirected around a wheel 103 or other transfer mechanism at an angle of about 90 degrees.

The orientation and number of infrared units 101 as shown in FIG. 1 may be varied, so long as the extruded product 102 is properly treated, i.e., the extruded product 102 is uniformly irradiated. For example, while FIG. 1 depicts six total infrared units 101, any number of infrared units 101 may be utilized. Further, although three infrared units 101 are shown as being disposed prior to the feeding apparatus 112 and three infrared units 101 are showing as being disposed after the feeding apparatus 112, any number of infrared units 101 may be placed before or after the feeding apparatus 112. In addition, while the sets 104, 108 of infrared units 101 are shown as being generally parallel, the sets 104, 108 may optionally be perpendicular, at any other angle with respect to one another, or along a single axis. Additionally, any number of wheels, gears, or other transferring and/or redirecting mechanisms may be utilized to transfer and/or redirect the extruded product 102 through the oven 100 and such transferring and/or redirecting mechanisms may be positioned at any point or points within the oven 100.

Figure 2:
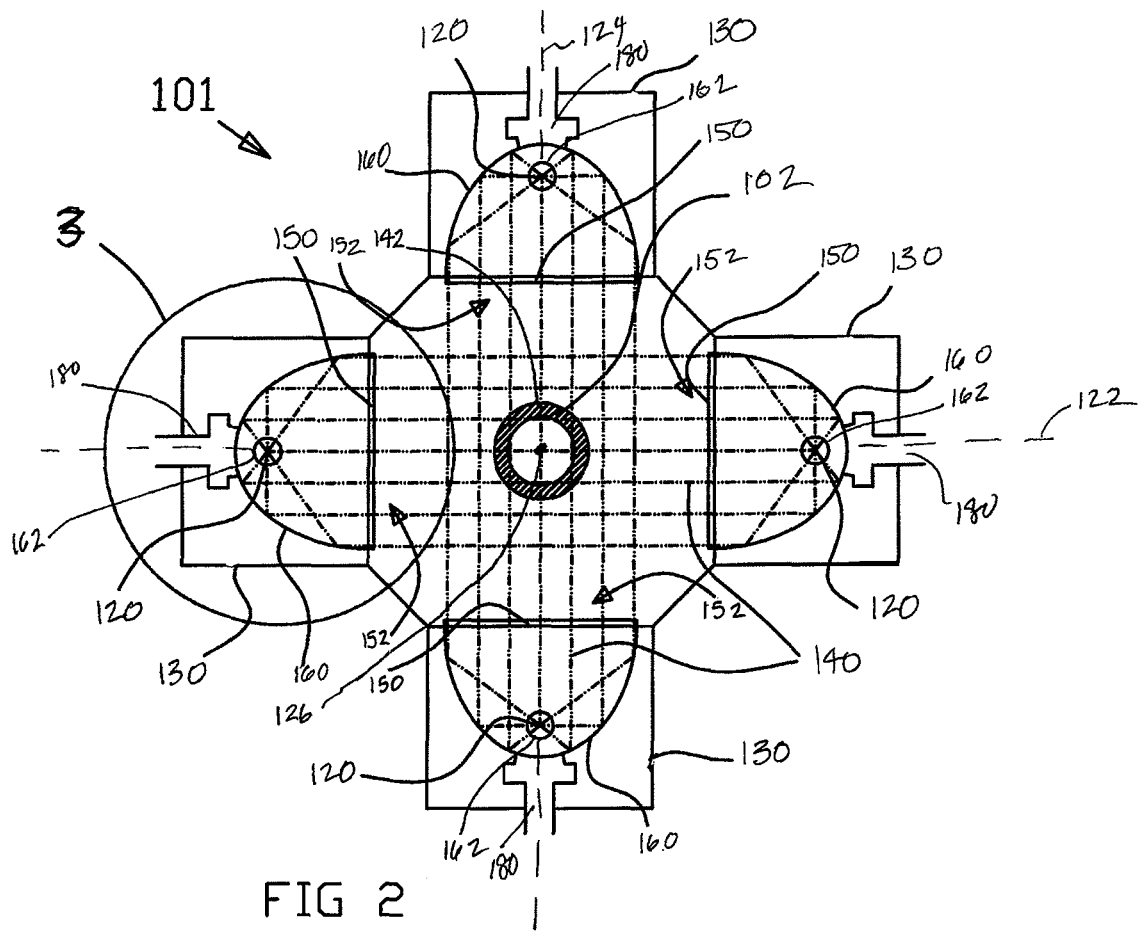
FIG. 2 is a cross-sectional view taken generally along the lines A-A of FIG. 1 and showing a single infrared lamp unit.
Figure 3:
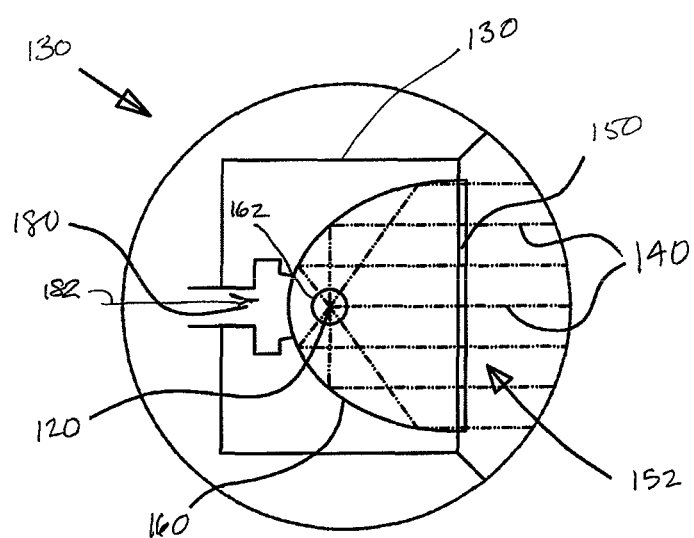
FIG. 3 is a magnified cross-sectional view of a portion of the infrared lamp unit of FIG. 2 and depicting in greater detail one housing containing an infrared lamp.

A single infrared unit 101 is depicted in detail in FIGS. 2 and 3, wherein each of the infrared units 101 may be similar in orientation and construction. The infrared unit 101 includes four infrared lamps 120 formed in a circle. Two of the lamps 120 are disposed opposite one another along a first axis 122 and the other two of the lamps 120 are disposed opposite one another along a second axis 124 with the first axis 122 and the second axis 124 being perpendicular. Each of the lamps 120 is therefore disposed at an angle of about 90 degrees about a centerpoint 126 of the unit 101 with respect to an adjacent lamp 120. Each lamp 120 is disposed within a separate housing 130. Although four lamps 120 are depicted in FIG. 2, any number of lamps 120 that would uniformly irradiate the extruded product 102 and irradiate the extruded product 102 from all sides may be utilized. One or more of the infrared units 101 may be different in orientation or construction from the other infrared units 101. For example, the number or location of the lamps 120 may be varied.

When the lamps 120 are activated and the oven 100 is in operation, each of the lamps 120 sends rays 140 of infrared radiation (only some of the rays 140 are labelled) toward the product 102. In one embodiment, the rays 140 are parallel, which adds flexibility to the overall system because tubes with different dimensions may be irradiated without the need to adjust the system. Some of the rays 140 penetrate through a surface 142 of the product, hit the additional material that is vibrating with the same frequency, change into heat, and cause a cross-linking reaction. As with the prior art, the wavelengths that are longer cannot penetrate the surface 142 of the extruded product 102 and, thus, the longer wavelengths are converted into heat and cause unfavourable heating of the surface 142 of the extruded product 102. It is therefore necessary to cool the extruded product 102 by directing a gas or air flow 143 onto the surface 143 of the extruded product 102. The gas flow 143 may be directed, in this example, between the housing 130 and the surface 142 of the extruded product 102 from a side 144 of the unit 101 (FIG. 1). Heat-resistant glass 150 is installed between each of the lamps 120 and the extruded product 102 to protect the lamps 120. In particular, the glass 150 prevents the gas flow 143 from hitting the infrared lamps 120 and prevents dirt or other debris from moving from the extruded product 102 to the lamps 120, while still allowing cooling of the surface 142 of the extruded product 102. The gas flow 143, or any of the gas flows disclosed herein, may be air, nitrogen, or any other gas flow sufficient for cooling. If an air flow is utilized, the air flow may be at ambient temperature and an intensity of an air flow would depend upon production speeds and the amount and level of infrared radiation.

The gas flow 143 can be directed to hit mainly the extruded product 102 and a second gas flow 152 may be arranged to impinge upon the sides of the glasses 150 facing the extruded product 102 to cool the glasses 150 and prevent the glasses 150 from emitting radiation that heats the surface 142 of the extruded product 102. It is possible to separately regulate the gas flows 143, 152 (e.g., by independent switches) and, thus, it is possible to regulate each of the gas flows 143, 152 (e.g. speed, temperature) independently from each other, if necessary. It is also possible to have separate gas flows and regulation for each of the different glasses 150 within a lamp unit 101. While the gas flows 143, 152 are disclosed as being flows of gas or air, the gas flows 143, 152 may each alternatively be one or more flows of any type or types of gas suitable for cooling an extruded material.

The direction of the gas flow 143 to the extruded product 102 may be from above downwards, from below upwards or some other direction, depending on the orientation of the infrared unit 101 and/or the oven 100. The amount of gas flow 143 may be regulated for the various infrared units 101. For example, the amount of gas flow 143 may be increased from a first of the infrared units 101 to a last of the infrared units in a process direction 160, as a temperature of the extruded product 102 generally increases in the process direction 160. Optionally, any other variation of gas flow 143 that produces a desired product may be implemented. Likewise, the gas flow(s) 152 that are used to cool the glasses 150 may be regulated differently in different infrared units 101 to correspond with the different needs of cooling of the different glasses 150 at different stages of the process.

Because some radiation from the infrared lamps 120 can get absorbed by the glasses 150, the glasses 150 can sometimes become sources of infrared radiation and begin sending radiation toward the surface 142 of the extruded product 102. As noted above, the gas flows 143 and 152 are regulated in speed, temperature, direction, etc. so that they cool both the surface of the product 102 and the glasses 150, respectively. The gas flows 143, 152 are regulated so that the surface 142 of the extruded product 102 does not react unfavourably (e.g., a burning smell is not created) and the glasses 150 do not emit infrared radiation.

Referring to FIG. 2, each of the housings 130 includes a reflective surface 160 generally enclosing a first side 162 of each of the lamps 120. The reflective surfaces 160 may be coated with gold, but may alternatively be coated with one or more other reflective materials. Each reflective surface 160 may have a shape that directs all of the rays of infrared radiation 140 emitted from a respective lamp 120 along parallel paths within the housing 130 and toward the extruded product 102. The parallel paths are also generally parallel to the axis 122 or 124 along which the respective lamp 120 is disposed. Any rays 140 of infrared radiation from opposite lamps 120 are also directed back in the direction from which they came by an opposing reflective surface 160.

As best seen in FIG. 3, a channel 180 is provided for guiding a third gas flow 182 (FIG. 3) through the housing 130. The third gas flow 182 may be utilized to cool and prevent damage to cabling inside the housing and/or other sensitive components disposed within the housing 130. As with the gas flows 143, 152, the gas flow 182 may include any type or types of gas flow that suitably cool the components within the housing 130.

To ensure that the infrared oven 100 of the present invention functions in the desired manner, a series of tests were conducted using the principles of the invention. A plastic tube having an outside diameter of 16 mm and a wall thickness of 2 mm was extruded utilizing methods known in the prior art. The tube was produced using high density polyethylene with a high molecular weight and before the extrusion, 0.45% of organic peroxide was mixed with the high density polyethylene. Immediately after extrusion of the tube, the tube was heated by the infrared radiation so that the heating length of the tube was 960 mm, the tube stayed in the oven for 6 seconds, the infrared efficiency was 36 kW, and the average wavelength of the infrared radiation was 1.6 micrometers. The temperature of the surface of the tube and in the middle of the wall immediately after the extrusion was 162° C.

Four tests were conducted and, in each case, the temperatures of a middle of the wall of the tube (T1) and the surface of the tube (T2) were measured after the infrared heating and the results are listed in the following chart:

| Test | T1 Temperature | T2 Temperature |
|---|---|---|
| Test 1, no insulating glass, no gas flow | 210° C. | 310° C. |
| Test 2, insulating glass, no gas flow | 210° C. | 340° C. |
| Test 3, no insulating glass, gas flow | 195° C. | 200° C. |
| Test 4, insulating glass, gas flow | 210° C. | 200° C. |

It can be seen from the results that the most balanced result is achieved with the arrangement of Test 4 where the gas flow cools both the surface of the tube and the insulating glass. This arrangement corresponds with the method according to the present invention. In Test 3, the gas flow also cooled the infrared source and, therefore, the measurement in the middle of the tube remained lower than in Test 4.

The method of using the oven 100 of the present invention to perform an infrared treatment on an extruded plastic or elastomeric product allows for cooling of the surface 142 of the extruded product 102 without decreasing the efficiency of the lamps 101. In particular, the extruded product 102 is transported from an extruder to the oven 100 and enters a first side of the oven 100. The extruded product 102 then proceeds through a number of lamp units 101, each lamp unit 101 including at least one lamp 120, a reflective surface 160 enclosing a first side of the lamp 120 and positioned to direct radiation from the lamp into parallel rays 140 of radiation, and a glass 150 disposed between the second side of the lamp 120 and the extruded product 102. The glass 150 separates the lamp 120 and the extruded product 102. The method further includes the steps of directing the extruded product 102 through the oven 100, directing the parallel rays of radiation at the extruded product 102 to create cross-linking between layers of the extruded product 102. A first flow of cooling gas 143 may be directed at a surface 142 of the extruded product 102 and a second flow of cooling gas 152 may be directed at the glass 150 for cooling the glass 150. The cooling gas 152 is focussed at an intensity, direction, and temperature that prevent the glass 150 from becoming an infrared source and the glass 150, again, prevents the gas flows 143, 152 from hitting and cooling the lamps 120.

While specific embodiments of the invention have been described in detail, it will be appreciated by those skilled in the art that various modifications and alternatives to those details could be developed in light of the overall teachings of the disclosure. For example, different materials possessing similar characteristics may be used and the positioning of each of the layers with respect to one another may be changed. Accordingly, the particular arrangement disclosed is meant to be illustrative only and not limiting as to the scope of the invention which is to be given the full breadth of the appended claims and any equivalents thereof.

What is claimed is:

1. A method for performing an infrared treatment in an infrared oven, the method comprising the steps of:
   receiving an extruded plastic or elastomeric product; feeding the extruded plastic or elastomeric product to an oven having at least one lamp unit, the at least one lamp unit including a lamp, a reflective surface enclosing a first side of the lamp and positioned to direct radiation from the lamp, and a glass disposed between a second side of the lamp and an extruded product, wherein the glass separates the lamp and the extruded product;
   creating cross-linking between layers of the extruded product by directing the radiation at the extruded product;
   directing a first gas flow at a surface of the extruded product that cools the extruded product; and
   preventing the glass from becoming an infrared source by directing a second gas flow at the glass between the glass and the extruded product whereby substantially no wavelengths of radiation are filtered by the glass.

2. The method of claim 1, further including the step of providing a plurality of lamp units each having four lamps, wherein two of the lamps are disposed along a first axis and the other two lamps are disposed along a second axis perpendicular to the first axis.

3. The method of claim 2, further including the step of providing glasses disposed between each of the four lamps and the extruded product.

4. The method of claim 3, further including the step of providing a second gas flow directed at each of the glasses.

5. The method of claim 4, wherein each of the lamps is disposed within a housing with the lamp being spaced from a first side of the housing and the glass being disposed adjacent a second side of the housing.

6. The method of claim 5, further including the step of providing third gas flow through a channel on the first side of the housing.

7. The method of claim 4, further including the step of providing separate second gas flows directed at each of the glasses.

8. The method of claim 1, further including the steps of providing the extruded plastic or elastomeric product as a tube and cooling a middle of a wall of the tube to a temperature of about 210° C.

9. The method of claim 8, further including the step of cooling a surface of the tube to a temperature of about 200° C.

10. A method for performing an infrared treatment in an infrared oven, the method comprising the steps of:
    receiving an extruded product;
    feeding the extruded product to an oven having a plurality of lamp units, each lamp units including a plurality of lamps, a reflective surface enclosing a first side of each lamp and positioned to direct radiation from the lamp into parallel rays of radiation, and a glass disposed between a second side of each lamp and an extruded product, wherein the glass separates the lamp and the extruded product;
    positioning two lamps along a first axis and two lamps along a second axis that is perpendicular to the first axis;
    creating cross-linking between layers of the extruded product by directing the parallel rays of radiation at the extruded product;
    directing a first gas flow at a surface of the extruded product to cool the extruded product; and
    directing a second gas flow at the glasses at an intensity, direction, and temperature that prevents the glasses from becoming infrared sources;
    whereby substantially no wavelengths of radiation are filtered by the glass.

11. The method of claim 10, further including the step of providing separate second gas flows directed at each of the glasses.

12. The method of claim 10, further including the steps of providing the extruded product as a plastic or elastomeric tube and cooling a middle of a wall of the tube to a temperature of about 210° C.

13. The method of claim 12, further including the step of cooling a surface of the tube to a temperature of about 200° C.

* * * * *